(12) United States Patent
Chiera et al.

(10) Patent No.: US 11,608,789 B1
(45) Date of Patent: Mar. 21, 2023

(54) ASYNCHRONOUS ROTARY FUEL VALVE (71) Applicant: Woodward, Inc., Fort Collins, CO (US)

(72) Inventors: Domenico Chiera, Fort Collins, CO (US); John Karspeck, Loveland, CO (US); Michael Ryan Buehner, Fort Collins, CO (US); Samuel James McCreery, Loveland, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/459,909

(22) Filed: Aug. 27, 2021

(51) Int. Cl.
*F02M 21/02* (2006.01)
*F02D 41/00* (2006.01)
*F02D 41/38* (2006.01)

(52) U.S. Cl.
CPC .......... *F02D 41/0027* (2013.01); *F02D 41/38* (2013.01); *F02M 21/023* (2013.01); *F02M 21/0233* (2013.01); *F02M 21/0272* (2013.01); *F02D 2041/389* (2013.01); *F02D 2200/101* (2013.01)

(58) Field of Classification Search
CPC .......... F02D 41/0027; F02D 2200/101; F02M 21/023; F02M 21/0233; F02M 21/0236; F02M 21/0239; F02M 21/0272
USPC ............ 123/27 GE, 190.1, 190.12, 336, 527
See application file for complete search history.

(56) References Cited

U.S. PATENT DOCUMENTS

| 4,738,233 | A | * | 4/1988 | Hitomi | F02B 29/083 |
| | | | | | 123/190.2 |
| 5,255,657 | A | * | 10/1993 | Stellwagen | F02D 35/025 |
| | | | | | 123/527 |
| 5,367,999 | A | | 11/1994 | King et al. | |
| 5,448,971 | A | * | 9/1995 | Blundell | F02B 25/22 |
| | | | | | 123/190.12 |
| 6,055,953 | A | * | 5/2000 | Weickel | F01L 7/02 |
| | | | | | 123/336 |
| 6,360,719 | B1 | | 3/2002 | Uitenbroek | |

(Continued)

FOREIGN PATENT DOCUMENTS

| CN | 105927406 | 9/2016 |
| EP | 0106699 | 4/1984 |

(Continued)

OTHER PUBLICATIONS

PCT International Search Report and Written Opinion in International Appln. No. PCT/US2019/022487, dated Jun. 11, 2019, 12 pages.

(Continued)

*Primary Examiner* — Erick R Solis
(74) *Attorney, Agent, or Firm* — Fish & Richardson P.C.

(57) ABSTRACT

A housing defines a gaseous fuel inlet and a gaseous fuel outlet. A rotor defines an internal flow passage therethrough that rotates with the rotor to, alternately, allow gaseous fuel flow, or to block gaseous fuel flow, between the inlet and the outlet, based on a position of the rotor. A seal is biased to abut an exterior surface of the rotor. The seal is between the rotor and the outlet. An actuator is rotably coupled to the rotor. The driver is configured to rotate the rotor. A controller is in communication with the driver and is configured to control the driver to rotate at a rate based on an engine speed of the engine.

24 Claims, 6 Drawing Sheets

(56) References Cited

U.S. PATENT DOCUMENTS

| | | | |
|---|---|---|---|
| 7,213,546 B2 * | 5/2007 | Vermeer | F01L 1/34403 123/80 BA |
| RE39,852 E * | 9/2007 | Uitenbroek | F02B 43/00 123/336 |
| 2001/0029918 A1 * | 10/2001 | Qattan | F01L 7/10 123/190.1 |
| 2011/0209678 A1 * | 9/2011 | Myers | F01L 7/026 123/90.31 |
| 2014/0102416 A1 | 4/2014 | Sivasubramanian et al. | |
| 2014/0261311 A1 * | 9/2014 | Bayer | F02M 21/023 123/336 |

FOREIGN PATENT DOCUMENTS

| | | | |
|---|---|---|---|
| JP | 03145524 A * | 6/1991 | |
| KR | 20130042712 | 4/2013 | |
| WO | WO 200142628 | 6/2001 | |

OTHER PUBLICATIONS

International Search Report and Written Opinion in International Appln. No. PCT/US2022075383, dated Dec. 6, 2022, 15 pages.

* cited by examiner

ASYNCHRONOUS ROTARY FUEL VALVE

TECHNICAL FIELD

This disclosure relates to rotary fuel valves for internal combustion engine systems.

BACKGROUND

Internal combustion engines take a combustible mixture of air and fuel to ignite the combustible mixture within a combustion chamber (e.g., a cylinder) to produce work due to the expansion of the ignited combustible mixture. In the case of a piston/cylinder engine, the air and fuel is generally mixed within an intake manifold prior to entering the engine cylinders, though direct injection engines that mix air and fuel within the cylinder are known as well.

Fuel is added by a fuel injector or fuel admitter. Such fuel introduction can add gaseous fuel and/or atomize liquid fuel such that it is easily ignited within the ignition chamber. Fuel injectors/admitters are sized based on a desired output of the internal combustion engine and the energy density of the fuel used.

SUMMARY

This disclosure describes an asynchronous rotary fuel valve.

An example of the subject matter described within this disclosure is a fuel admission valve for an engine. The fuel admission valve includes the following features. A housing defines a gaseous fuel inlet and a gaseous fuel outlet. A rotor defines an internal flow passage therethrough that rotates with the rotor to, alternately, allow gaseous fuel flow, or to block gaseous fuel flow, between the inlet and the outlet, based on a position of the rotor. A seal is biased to abut an exterior surface of the rotor. The seal is between the rotor and the outlet. An actuator is rotably coupled to the rotor. The driver is configured to rotate the rotor. A controller is in communication with the driver and is configured to control the driver to rotate at a rate based on an engine speed of the engine.

Aspects of the example fuel admission valve, which can be combined with the example fuel admission valve alone or in combination with other aspects, include the following. The controller is further configured to adjust the rotor independent of a cylinder intake valve.

Aspects of the example fuel admission valve, which can be combined with the example fuel admission valve alone or in combination with other aspects, include the following. The controller is configured to control the rotor to rotate continuously in a single direction.

Aspects of the example fuel admission valve, which can be combined with the example fuel admission valve alone or in combination with other aspects, include the following. The driver includes a stepper motor.

Aspects of the example fuel admission valve, which can be combined with the example fuel admission valve alone or in combination with other aspects, include the following. The rotor includes a disc with a spherically shaped circumferential edge.

Aspects of the example fuel admission valve, which can be combined with the example fuel admission valve alone or in combination with other aspects, include the following. The internal flow passage comprises a non-circular opening, at ends of the internal flow passage, corresponding to a specified shape of an injector pulse.

Aspects of the example fuel admission valve, which can be combined with the example fuel admission valve alone or in combination with other aspects, include the following. The non-circular profile comprises a substantially oval shape.

Aspects of the example fuel admission valve, which can be combined with the example fuel admission valve alone or in combination with other aspects, include the following. The non-circular profile is asymmetric.

Aspects of the example fuel admission valve, which can be combined with the example fuel admission valve alone or in combination with other aspects, include the following. The seal encircles an outlet of the internal flow passage when the internal flow passage is aligned with the gaseous fuel outlet.

Aspects of the example fuel admission valve, which can be combined with the example fuel admission valve alone or in combination with other aspects, include the following. A check valve is in the fuel outlet.

An example implementation of the subject matter described within this disclosure is a method with the following features. A gaseous fuel is received from a pressurized gaseous fuel manifold by a gaseous fuel inlet of a fuel admission valve. A flow of the gaseous fuel from the gaseous fuel inlet to a gaseous flow outlet is regulated, responsive to a fuel control signal, by a rotating rotor with a flow passage therethrough. The flow passage rotates with the rotor. The gaseous fuel is supplied to a manifold of an internal combustion engine by the flow outlet.

Aspects of the example method, which can be combined with the example method alone or in combination with other aspects, include the following. Regulating the flow of the gaseous fuel includes rotating the rotor by a driver. The rotor rotates at a speed that is a function of an engine speed of the internal combustion engine.

Aspects of the example method, which can be combined with the example method alone or in combination with other aspects, include the following. Rotating the rotor includes continuously rotating the valve in a single direction.

Aspects of the example method, which can be combined with the example method alone or in combination with other aspects, include the following. The flow is further regulated by a profile of the flow passage tuned to form a specified fuel admission rate profile.

Aspects of the example method, which can be combined with the example method alone or in combination with other aspects, include the following. Air is mixed with the gaseous fuel within the manifold, downstream of the flow outlet, prior to entering a combustion cylinder.

An example implementation of the subject matter described within this disclosure is an engine system with the following features. An intake manifold is configured to receive air from an air intake and configured to receive fuel from a fuel port. A gaseous fuel admission valve is configured to supply a gaseous fuel to an intake manifold by the fuel port. The fuel admission valve includes a housing defining a gaseous fuel inlet and a gaseous fuel outlet. A rotor defines an internal flow passage therethrough that rotates with the rotor to allow gaseous fuel flow, or to block gaseous fuel flow, between the inlet and the outlet based on a position of the rotor. A seal defines a portion of an outlet flow passage. The seal is biased to abut a movable surface of the rotor. The seal is between the rotor and the outlet. A driver is rotably coupled to the rotor. The driver is configured to rotate the rotor. A controller is configured to control the driver to rotate at a rate that is a function of a speed of an engine. The controller is configured to adjust the rotor independent of the intake valve. The controller is configured to send an electrical signal to the driver to rotate the rotor continuously in a single direction.

Aspects of the example engine system, which can be combined with the example engine system alone or in combination with other aspects, include the following. The intake manifold includes outlets. A number of outlets corresponds to a number of combustion cylinders of the internal combustion engine. The fuel port is a first fuel port. The intake manifold includes fuel ports corresponding to the number of outlets. Each fuel outlet includes a fuel port. The gaseous fuel injector is a first gaseous fuel injector. The engine system includes multiple gaseous fuel injectors. A number of fuel injectors corresponds to the number of fuel ports. Each of the injectors fluidically connects to a corresponding fuel port.

Aspects of the example engine system, which can be combined with the example engine system alone or in combination with other aspects, include the following. The intake manifold includes outlets. The controller is further configured to adjust a speed of a first of the plurality of drivers based on received engine parameters.

Aspects of the example engine system, which can be combined with the example engine system alone or in combination with other aspects, include the following. The intake manifold includes outlets. The controller is further configured to adjust a speed of a second of the plurality of drivers to be a different speed than the first of the plurality of drivers.

Aspects of the example engine system, which can be combined with the example engine system alone or in combination with other aspects, include the following. The intake manifold includes outlets. The drivers are electric motors. The controller is configured to adjust the speed of one of the drivers by adjusting the electrical signal to one of the electric motors.

Aspects of the example engine system, which can be combined with the example engine system alone or in combination with other aspects, include the following. The fuel admission valve is arranged to deliver fuel directly to a cylinder of an internal combustion engine.

Aspects of the example engine system, which can be combined with the example engine system alone or in combination with other aspects, include the following. The flow passage comprises a profile defining a specified shape of an injector pulse.

The details of one or more implementations are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Low energy density gaseous fuels, such as hydrogen, can be difficult for fuel injectors due to the large flow rates of gaseous fuel needed in such applications. In addition, low molar weight gaseous fuels are prone to leakage through traditional fuel admission systems. This disclosure describes a fuel admission/injection valve that includes a rotor that defines an internal flow passage therethrough that rotates with the rotor to allow gaseous fuel flow or to block gaseous fuel flow between the inlet and the outlet based on a position of the rotor. The rotor is driven by a driver rotably coupled to and configured to rotate the rotor. The rotational speed of the rotor can be adjusted and controlled by an engine controller such that the rotor rotates to meter port fuel admission/injection based on a variety of engine parameters, such as engine speed.

Figure 1:
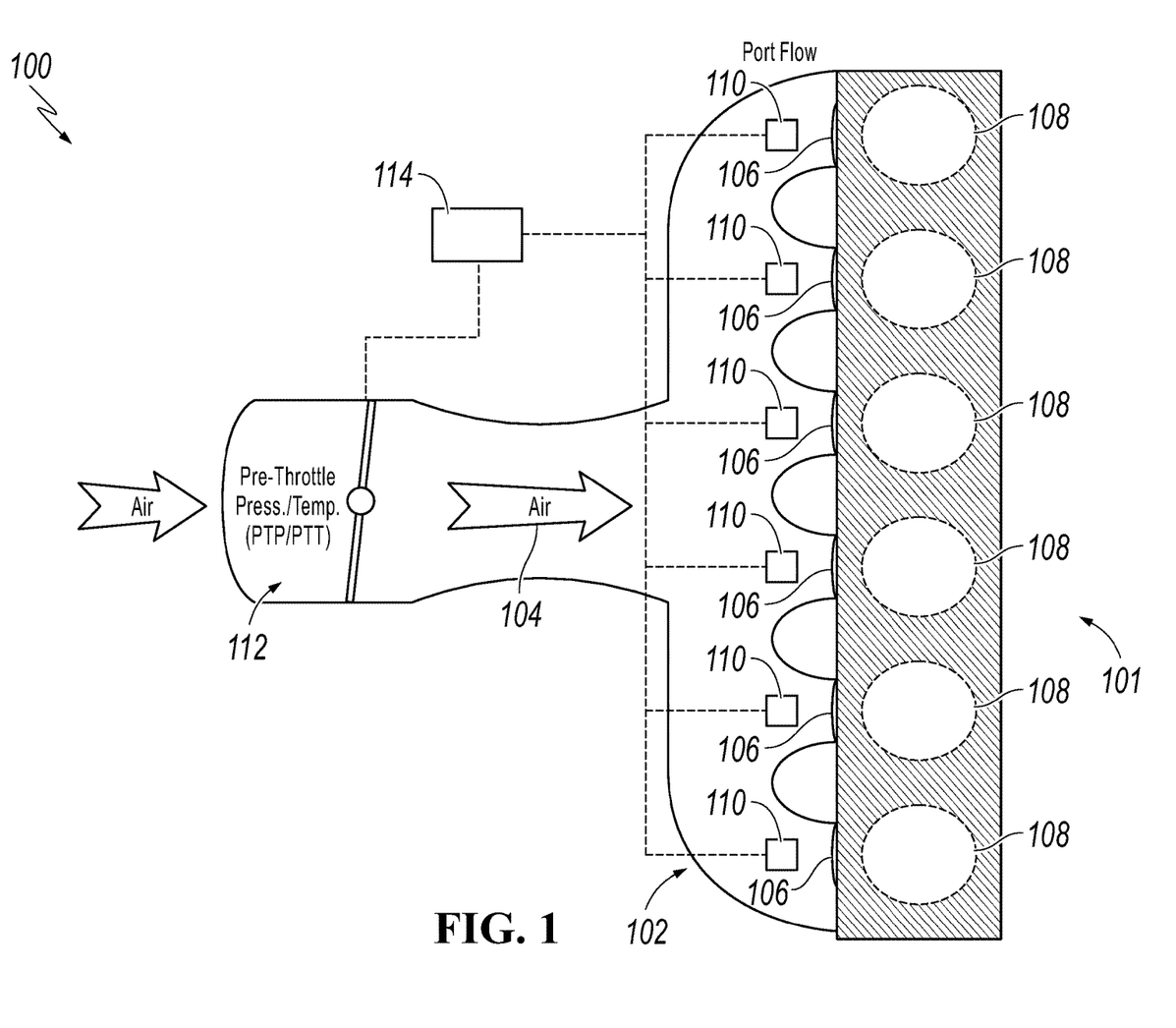
FIG. 1 is a schematic diagram of an internal combustion intake manifold.

FIG. 1 is a schematic diagram of an internal combustion engine 101 intake manifold 102 for an internal combustion engine system 100. The intake manifold 102 is configured to receive air 104 from an air intake. Between the air intake and the port 106 to the cylinders 108 is a throttle 112. The throttle 112 regulates a flowrate of air into the intake manifold 102. The intake manifold includes multiple outlets, or ports 106. The number of ports 106 corresponds to a number of combustion cylinders 108 of the internal combustion engine 101. For example, as illustrated, the intake manifold 102 has six ports 106 corresponding to six combustion cylinders 108. While the illustrated implementation includes an in-line, six-cylinder engine, the subject matter described herein is applicable to other internal combustion engine configurations, for example, a cylinder engine with fewer or additional cylinders and/or a V-configuration, a rotary engine, or a gas-turbine.

Fuel injection/admission valves 110 are fluidically connected to the inside of the intake manifold 102 by fuel ports (not shown, underneath the fuel injection/admission valves 110). The illustrated implementation includes a port injection arrangement. As such, there is a corresponding fuel port and fuel injection/admission valve 110 for each cylinder 108 of the engine 101.

While primarily illustrated and described in terms of port injection arrangements, other arrangements can be used without departing from this disclosure. For example, the subject matter described herein can be applied to direct injection systems. In such implementations, the fuel injection/admission valves 110 are arranged to deliver fuel directly to a corresponding cylinder 108 of an internal combustion engine. In some implementations, a single point injection system can be used. In such an implementation, a single injection/admission valve 110 can be used to supply fuel to the entire manifold. The concepts described herein are also applicable to batch and/or sequential injection applications.

Regardless of the injection/admission arrangement, the fuel injection/admission valves are coupled to, and controlled by, a controller 114. The controller 114 can be a part of the engine control unit, or it can be a stand-alone controller. Details of the controller 114 are described throughout this disclosure. In general, the controller 114 controls the fuel injection/admission valves 110 to admit fuel at the desired rate, desired duration, and at the desired time based on engine operation parameters.

Figure 2:
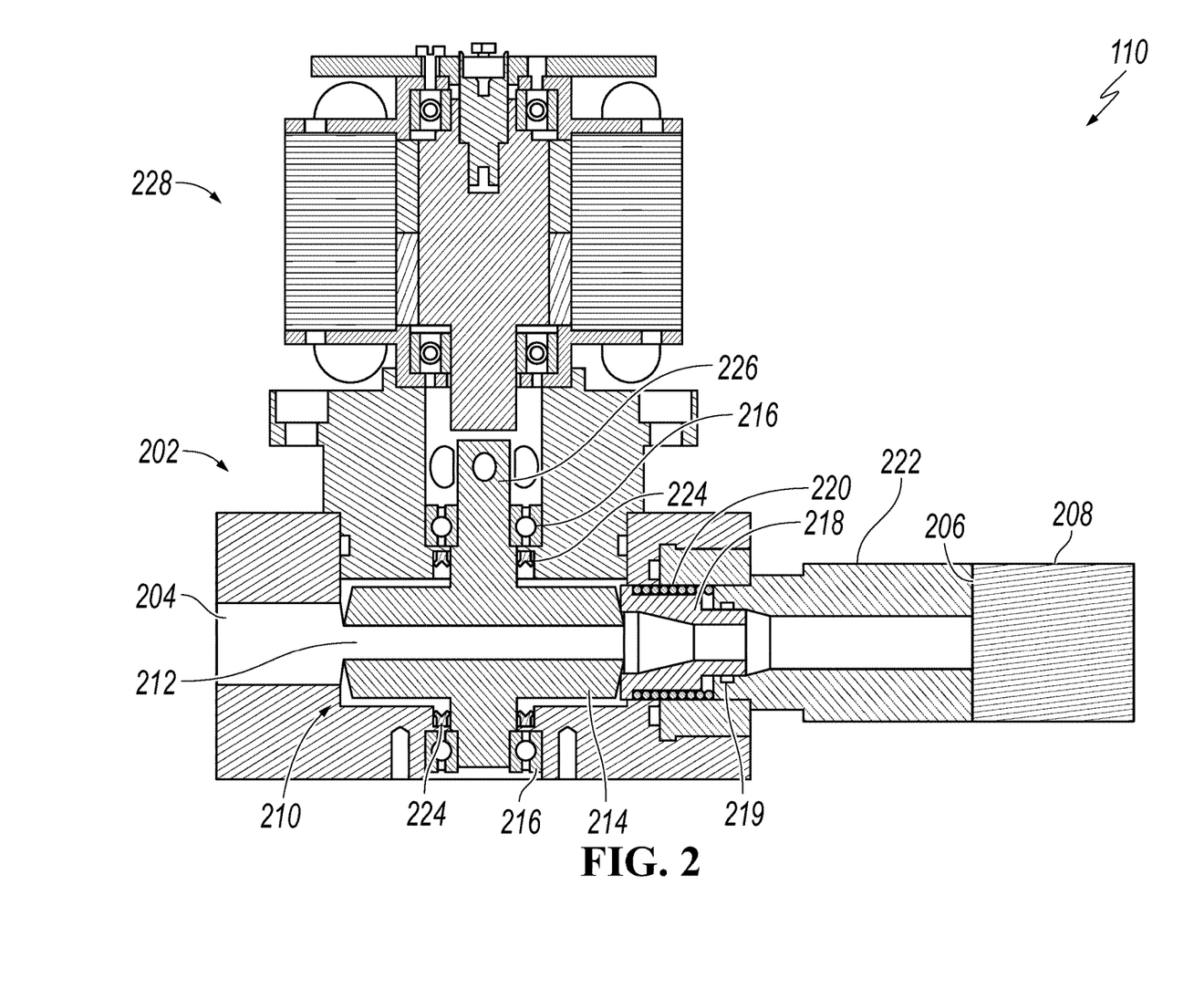
FIG. 2 is a side cross-sectional view of an example fuel admission valve.

FIG. 2 is a side cross-sectional view of an example fuel admission valve 110. The fuel admission valve 110 includes a housing 202 defining a gaseous fuel inlet 204 and a gaseous fuel outlet 206. The gaseous fuel inlet 204 is fluidically coupled to the intake manifold 102 (FIG. 1) as previously described. The gaseous fuel outlet 206 is fluidically connected to an intake manifold of an internal combustion engine, or directly to an inlet of an engine cylinder. In some implementations, a check valve 208 can be included at the gaseous fuel outlet 206, especially for direct injection (e.g. being directly coupled to a cylinder inlet) applications.

Housed within the housing 202 is a rotor 210 defining an internal flow passage 212 therethrough. The internal flow passage 212 rotates in unison with the rotor 210 to allow, regulate, or block gaseous fuel flow between the inlet 204 and the outlet 206 based on a position of the rotor 210. In some implementations, the flow passage 212 has a non-circular opening, or profile, at an end of the flow passage 212. Regardless of the profile/shape, the flow passage defines a specified shape of an injector pulse. That is, the profile/shape of the passage 212 helps define a specified fuel admission rate profile during operation. Details on the passage 212 and its effect on the injector pulse are described throughout this disclosure. In some implementations, the rotor includes a disc 214 with a spherically shaped edge. Other rotor shapes can be used without departing from this disclosure. The rotor 210 is trunnion mounted; however, a floating (or overhung) rotor arrangement can be used without departing from this disclosure. The rotor 210 is supported by the housing 202 by bearings 216 at each end of the rotor. While illustrated as ball bearings, the bearings 216 can be any bearing suitable for the service, for example, journal bearings. In some implementations, the bearings can be self-lubricating bearings. In some implementations, greased bearings or actively lubricated bearings can be used.

A seal 218 defines a portion of an outlet flow passage 206. The seal 218 is biased to abut a circumferential outer surface of the rotor 210. The seal is located between the rotor 210 and the outlet 206. In some implementations, additions seals, such as an o-ring 219, can be used to maintain sealing throughout the outlet passage. The seal's placement mitigates egress of the gaseous fuel from the inlet, around the rotor, and to the outlet, ensuring that the primary gas path is through the passage 212 as the rotor 210 rotates. In some implementations, the seal has a substantially circular cross-section that surrounds an outlet of the internal flow passage 212 when the internal flow passage 212 is aligned with the gaseous fuel outlet 206. The seal 218 itself can be biased in a variety of ways, for example, by a compression spring 220. The compression spring 220 abuts a shoulder of the seal 218 at a first end and a shoulder of an outlet connector 222 at the other end. While illustrated as being biased by the compression spring 220, other biasing mechanisms, such as a tension spring, can be used without departing from this disclosure. In some implementations, the seal 218 can bias itself against the rotor. Regardless of the bias details, the seal 218 is received and/or retained within the housing 202 such that the seal is allowed to move along an axis of the outlet flow passage. The seal 218 itself can be made of a variety of materials suitable for the application, for example, the seal can include a carbon or an elastomer. In some implementations, the seal 218 can include a metallic or ceramic material with a hardness less than that of the rotor 210, for example, brass. Regardless of the material used for the seal 218, the material contacting the surface of the rotor 210 is softer than the rotor 210 itself. In some implementations, the rotor circumference has a seal surface of specified surface finish selected to facilitate sealing with the seal 218.

The housing 202 includes chevron seals 224 around the rotor shaft 226 to mitigate gas ingress into the bearings and the outside environment. While the illustrated implementation shows a single chevron seal 224 at each end of the rotor 210, additional chevron seals 224 can be stacked to improve sealing ability. Similarly, other types of dynamic seals can be used without departing from this disclosure.

A driver 228 is rotably coupled to the rotor 210 by a coupling (not shown). The driver 228 is configured to rotate the rotor. In some implementations, the driver 228 includes an electric motor. Such a motor can include any type of motor (e.g., a stepper motor, a permanent magnet motor, inductive motor, etc.) that has sufficient position sensing to allow for closed loop control of the rotor position. For example, a stepper motor can be used, or an inductive motor with an encoder or other position sensors can be used. Regardless of the driver used, the driver 228 is coupled to the controller 114 to control the driver to rotate at a rate that is a function of engine parameters interpreted by the controller 114, for example, engine speed. In some implementations, the rotor 210 is controlled by the driver 228 to rotate continuously in a single direction (i.e., without stopping, while the engine is operating). While the speed of the rotor can be adjusted during operation, the rotational speed does not go to 0. In some implementations, the speed of individual rotors associated with individual cylinders can be adjusted to individually adjust the fuel trim for each cylinder.

Figure 3:
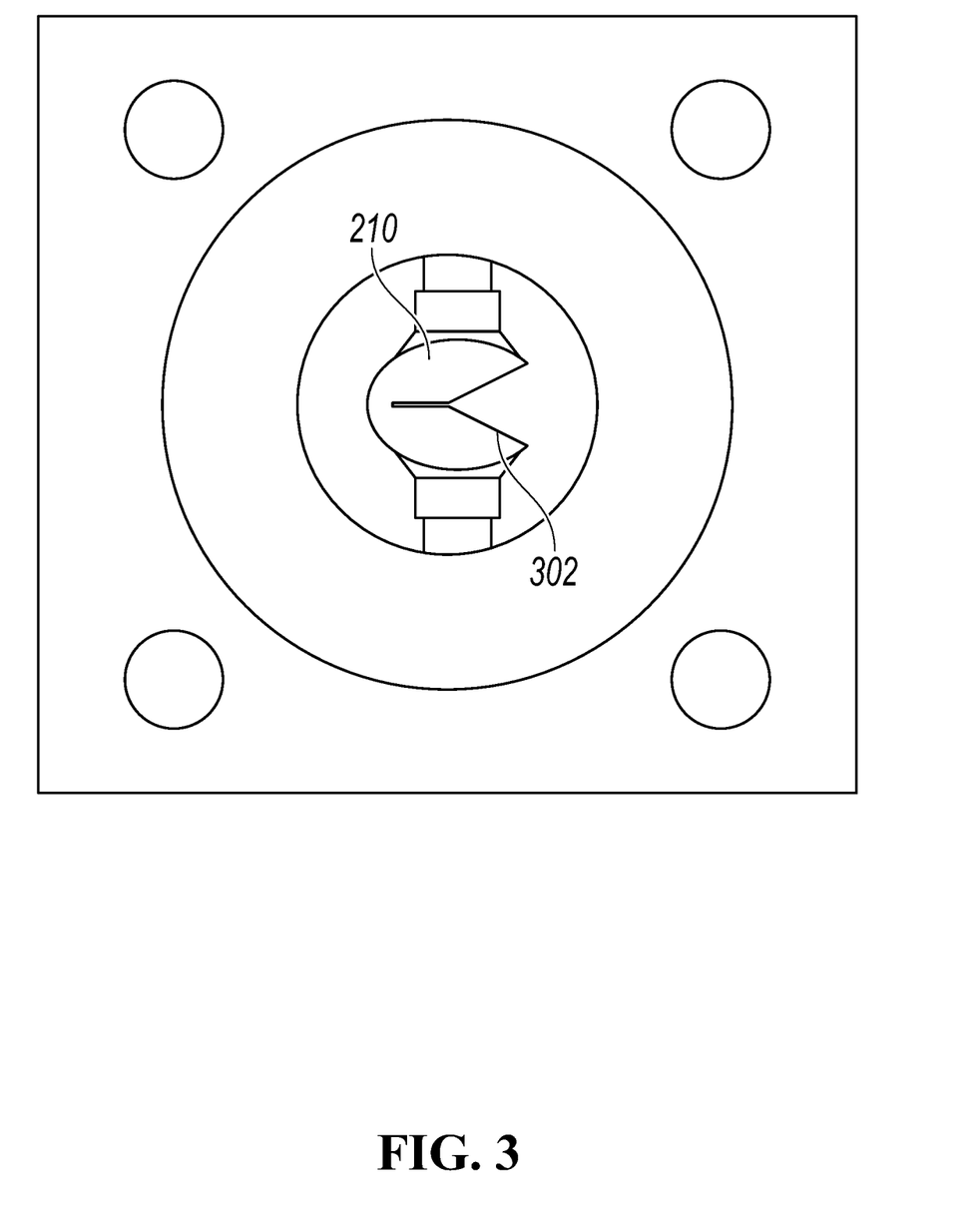
FIG. 3 is a side view of an example rotor and passage opening of the example fuel admission valve.

FIG. 3 is a side view of an example rotor and passage profile of the example fuel admission valve 110. In some implementations, the passage 212 can define a non-circular profile, for example, a lemon-shaped (or oval-shaped) profile 302. In some implementations, the non-circular profile can be asymmetric. The shape of this profile can be used to adjust the injector pulse profile. For example, an asymmetric profile can be used when opening and closing times are desired to be different.

Figure 4A:
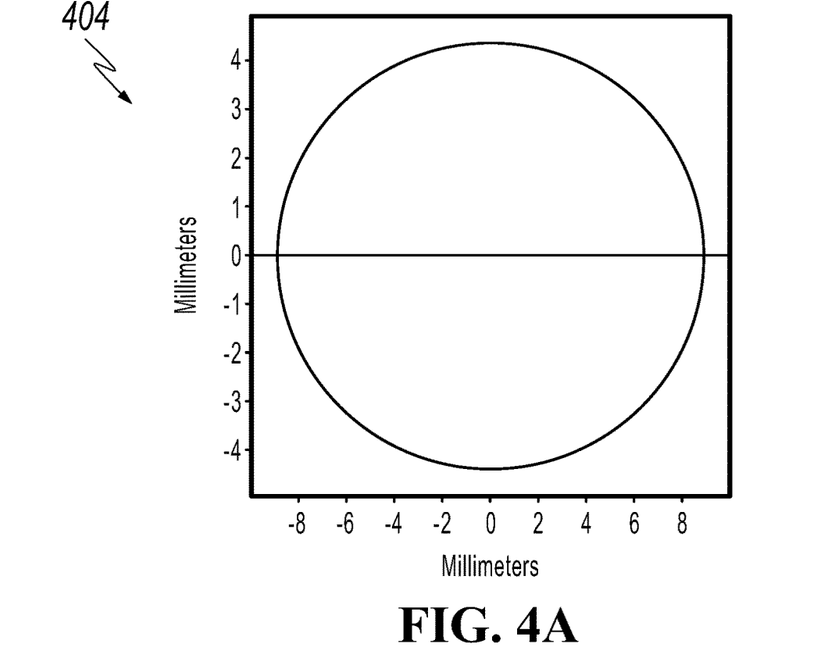
FIGS. 4A-4B is an example fuel delivery profile and a circular passage opening that provides the example fuel delivery profile.
Figure 4B:
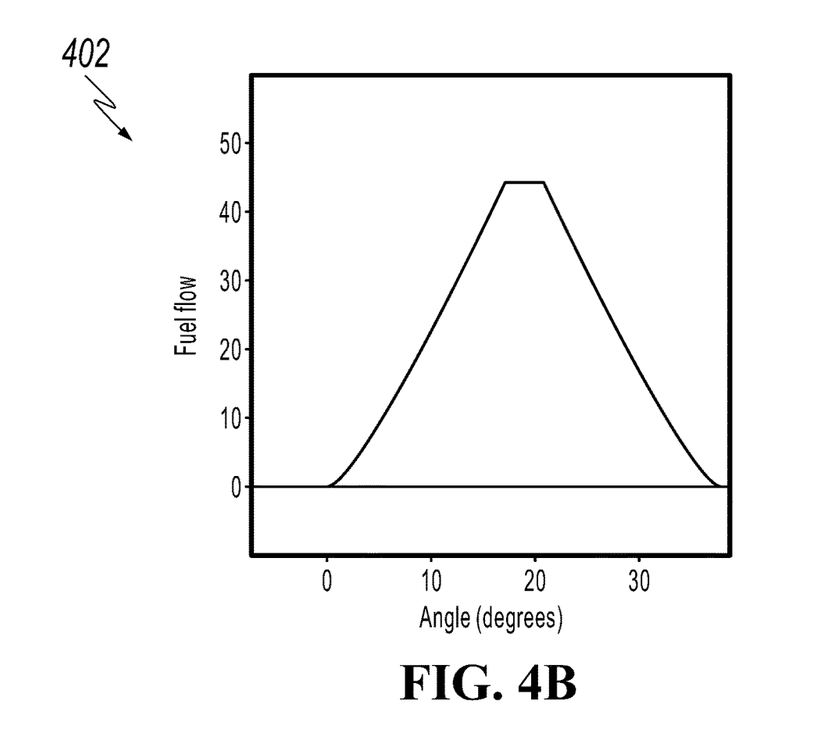

FIGS. 4A-4B are an example fuel delivery profile 402 provided by a circular passage profile 404. The circular passage results in a fuel admission rate profile, or fuel delivery profile 402 (sometimes referred to as an injector pulse), during operation. Different passage profile shapes yield different fuel delivery profiles. In some implementations, the passage profile shape may be configured to produce a substantially square fuel delivery profile. In some implementations, the passage profile shape may be configured to produce an asymmetrical fuel delivery profile.

Figure 5:
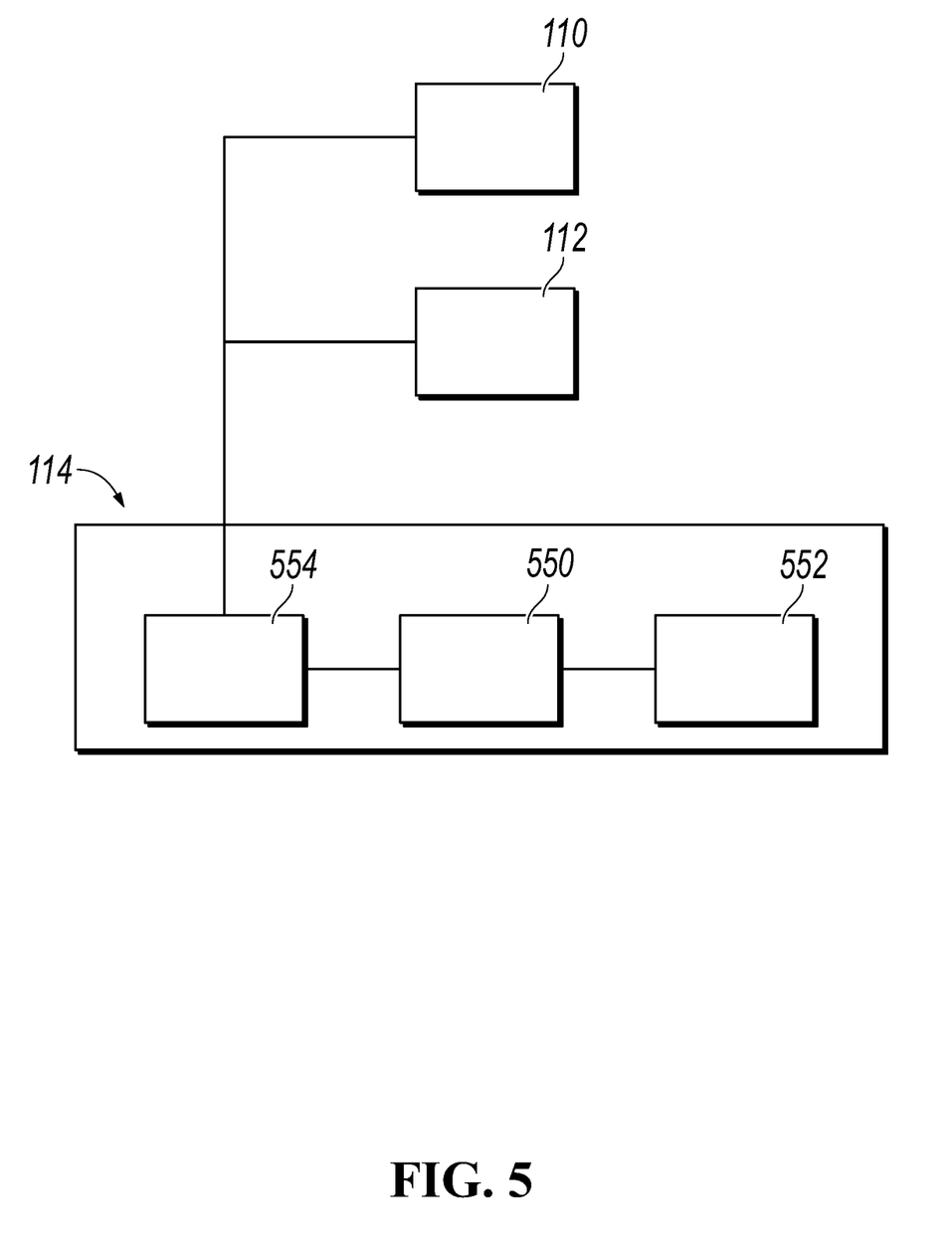
FIG. 5 is a block diagram of an example controller that can be used with aspects of this disclosure.

FIG. 5 is a block diagram of an example controller 114 that can be used with aspects of this disclosure. The controller 114 can, among other things, monitor parameters of engine system 100 and send signals to actuate and/or adjust various operating parameters of the engine system 100. As shown in FIG. 5, the controller 114, in certain instances, includes a processor 550 (e.g., implemented as one processor or multiple processors) and a non-transitory memory 552 (e.g., implemented as one memory or multiple memories) containing instructions that cause the processors 550 to perform operations described herein. The processors 550 are coupled to an input/output (I/O) interface 554 for sending and receiving communications with components in the system, including, for example, the fuel admission valves 110. In certain instances, the controller 114 can additionally communicate status with and send actuation and/or control signals to one or more of the various system components (including an actuator system, such as the throttle 112) of the engine system 100, as well as other sensors (for example, a cam angle sensor, an RPM sensor, a MAF/MAP sensor, an 02 sensor, and other types of sensors) provided in the engine system 100. In certain instances, the controller 114 can communicate status and send actuation and control signals to one or more of the components within the engine system 100, such as fuel admission valves 110. The communications can be hard-wired, wireless, or a combination of wired and wireless. In some implementations, controllers similar to the controller 114 can be located elsewhere, such as in a control room, elsewhere on a site or within a vehicle, or even remote from the site or vehicle. In some implementations, the controller 114 can be a distributed controller with different portions located within an engine bay, or about a site or vehicle. Additional controllers can be used throughout the site or vehicle as stand-alone controllers or networked controllers without departing from this disclosure.

In operation, the controller 114 controls the driver 228 (FIG. 2) to rotate at a rate that is a function of an engine speed. That being said, the controller is also able to adjust the driver to adjust the rotor independent of the intake valve, for example, in situations where an injection pulse width is desired to be changed. To facilitate such changes, the controller 114 sends an electrical signal to the designated driver 228 to rotate the rotor continuously in a single direction, though perhaps at a variable speed.

In some implementations, the controller can also adjust fuel trims on individual cylinders. In such implementations, the controller is configured to adjust a speed of a first driver based on received engine parameters, and adjust a second driver to be a different speed than the first driver. Such trims are often minor, but can greatly improve overall engine efficiency.

Figure 6:
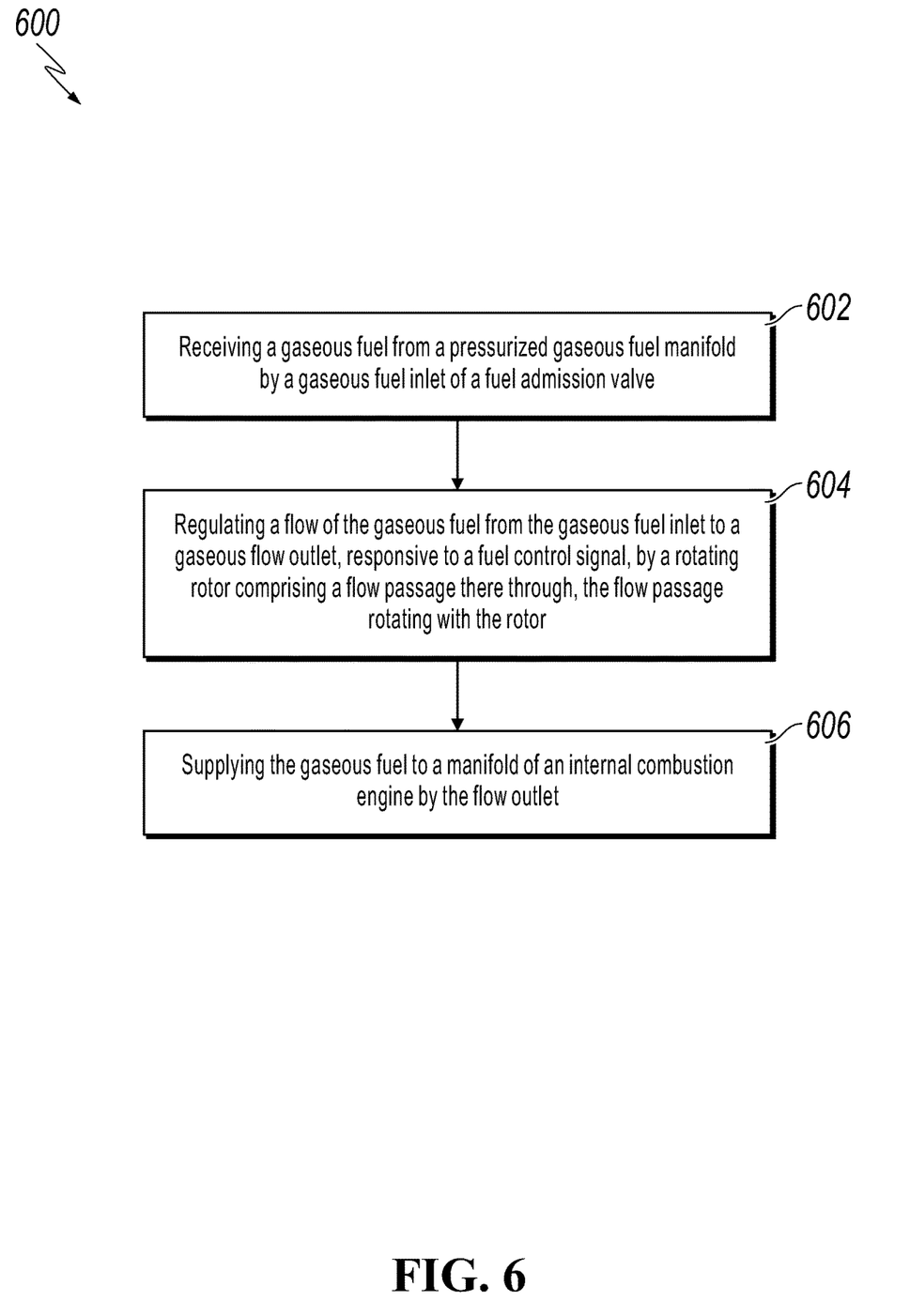
FIG. 6 is a flowchart of an example method that can be used with aspects of this disclosure.

FIG. 6 is a flowchart of an example method 600 that can be used with aspects of this disclosure. In some implementations, all or part of the method 600 can be performed by the controller 114. At 602, a gaseous fuel, for example, natural gas or hydrogen, is received from a pressurized gaseous fuel manifold by a gaseous fuel inlet 204 of a fuel admission valve 110.

At 604, a flow of the gaseous fuel from the gaseous fuel inlet to a gaseous flow outlet is regulated, responsive to a fuel control signal, by a rotating rotor. The rotating rotor includes a flow passage therethrough that rotates with the rotor. In some implementations, regulating the flow of the gaseous fuel includes rotating the rotor, by a driver, at a speed that is a function of an engine speed of the internal combustion engine. In some implementations, the rotor is continuously rotated in a single direction. The flow is further regulated by a profile of the flow passage tuned to form a specified fuel admission rate profile.

At 606, the gaseous fuel is supplied to a manifold of an internal combustion engine by the flow outlet. Within the manifold, air is mixed with the gaseous fuel, downstream of the flow outlet, and prior to entering a combustion cylinder.

A number of implementations have been described. Nevertheless, it will be understood that various modifications may be made without departing from the spirit and scope of the invention. Accordingly, other embodiments are within the scope of the following claims.

What is claimed is:

1. A fuel admission valve for an engine, comprising:
   a housing defining a gaseous fuel inlet, and a gaseous fuel outlet fluidly connected to an air intake manifold of the engine or fluidly connected to a combustion cylinder of the engine, and configured to supply gaseous fuel via the gaseous fuel outlet to air from the air intake manifold;
   a rotor defining an internal flow passage therethrough that rotates with the rotor to, alternately, allow gaseous fuel flow or to block gaseous fuel flow between the inlet and the outlet based on a position of the rotor;
   a seal biased to abut an exterior surface of the rotor, the seal being between the rotor and the outlet;
   an actuator rotably coupled to the rotor, the actuator configured to rotate the rotor; and
   a controller in communication with the actuator and configured to control the actuator to rotate at a rate based on an engine speed of the engine to controllably admit gaseous fuel to the air, downstream of the gaseous fuel outlet, at one or more of a predetermined rate, duration, and time based on one or more engine operation parameters, prior to entering the combustion cylinder.

2. The fuel admission valve of claim 1, wherein the controller is further configured to adjust the rotor independent of a cylinder intake valve.

3. The fuel admission valve of claim 1, wherein the controller is configured to control the rotor to rotate continuously in a single direction.

4. The fuel admission valve of claim 1, where the actuator comprises a stepper motor.

5. The fuel admission valve of claim 1, where the rotor comprises a disc with a spherically shaped circumferential edge.

6. The fuel admission valve of claim 1, where the internal flow passage comprises a non-circular opening, at ends of the internal flow passage, corresponding to a specified shape of an injector pulse.

7. The fuel admission valve of claim 6, where the non-circular opening comprises a substantially oval shape.

8. The fuel admission valve of claim 6, wherein the non-circular opening is asymmetric.

9. The fuel admission valve of claim 1, where the seal encircles an outlet of the internal flow passage when the internal flow passage is aligned with the gaseous fuel outlet.

10. The fuel admission valve of claim 1, comprising a check valve in the fuel outlet.

11. A method comprising:
    receiving, by an intake manifold, air from an air intake of an internal combustion engine;
    receiving a gaseous fuel from a pressurized gaseous fuel manifold by a gaseous fuel inlet of a fuel admission valve;
    regulating a flow of the gaseous fuel from the gaseous fuel inlet to a gaseous flow outlet and into the air in the intake manifold at one or more of a predetermined rate, duration, and time responsive to a fuel control signal, by a rotating rotor comprising a flow passage therethrough, the flow passage rotating with the rotor; and
    supplying the gaseous fuel to the air, downstream of the gaseous fuel outlet, prior to entering a combustion cylinder of the internal combustion engine by the flow outlet.

12. The method of claim 11, where regulating the flow of the gaseous fuel comprises rotating the rotor by a driver, the rotor rotating at a speed that is a function of an engine speed of the internal combustion engine.

13. The method of claim 12, where rotating the rotor comprises continuously rotating the valve in a single direction.

14. The method of claim 11, where the flow is further regulated by a profile of the flow passage tuned to form a specified fuel admission rate profile.

15. The method of claim 11, comprising mixing air with the gaseous fuel within the manifold, downstream of the flow outlet, prior to entering the combustion cylinder.

16. An engine system comprising:
- an internal combustion engine having an intake valve;
- an intake manifold configured to receive air from an air intake and configured to receive fuel from a fuel port; and
- a gaseous fuel admission valve outside of the intake manifold and configured to supply a gaseous fuel into the intake manifold by the fuel port, the fuel admission valve comprising:
  - a housing defining a gaseous fuel inlet and a gaseous fuel outlet coupled to the fuel port;
  - a rotor defining an internal flow passage therethrough that rotates with the rotor to allow gaseous fuel flow or to block gaseous fuel flow between the gaseous fuel inlet and the gaseous fuel outlet based on a position of the rotor;
  - a seal defining a portion of an outlet flow passage, the seal biased to abut a movable surface of the rotor, the seal being between the rotor and the outlet;
  - a driver rotably coupled to the rotor, the driver configured to rotate the rotor; and
  - a controller configured to:
    - control the driver to rotate at a rate that is a function of an engine speed;
    - adjust the rotor independent of the intake valve based on one or more engine operation parameters;
    - send an electrical signal to the driver to rotate the rotor continuously in a single direction; and
    - controllably admit, by the intake valve, gaseous fuel to the air, downstream of the gaseous fuel outlet, at one or more of a predetermined rate, duration, and time, prior to entering the combustion cylinder.

17. The engine system of claim 16, where the intake manifold comprises a plurality of outlets, a number of outlets corresponding to a number of combustion cylinders of the internal combustion engine, where the fuel port is a first fuel port, the intake manifold comprising a plurality of fuel ports corresponding to the number of outlets, each fuel outlet comprising a fuel port, where the gaseous fuel admission valve is a first gaseous fuel injector, the engine system comprising a plurality of gaseous fuel injectors, a number of fuel injectors corresponding to the number of fuel ports, each of the plurality of injectors fluidically connected to a corresponding fuel port.

18. The system of claim 17, wherein the driver is a first driver of a plurality of drivers rotatably coupled to a plurality of rotors, where the rotor is a first rotor, and the controller is further configured to:
- adjust a speed of a first of the plurality of drivers based on received engine parameters.

19. The system of claim 18, where the controller is further configured to adjust a speed of a second driver of the plurality of drivers to be a different speed than the first of the plurality of drivers.

20. The system of claim 16, where the drivers is an electric motor, and the controller is configured to adjust the speed of the driver by adjusting the electrical signal to the electric motor.

21. The system of claim 16, where the fuel admission valve is arranged to deliver fuel directly to the cylinder of the internal combustion engine.

22. The engine system of claim 16, where the flow passage comprises a profile defining a specified shape of an injector pulse.

23. The engine system of claim 16, further comprising a throttle valve arranged in the air intake.

24. The method of claim 11, wherein the internal combustion engine further comprises a throttle valve arranged in the air intake.

* * * * *